United States Patent [19]
Fleming et al.

[11] 4,096,422
[45] Jun. 20, 1978

[54] MOTOR CONTROL SYSTEM

[75] Inventors: John Augustus Fleming; Frank James Allen, both of Newtown, Conn.

[73] Assignee: E. I. Du Pont de Nemours and Company, Wilmington, Del.

[21] Appl. No.: 637,540

[22] Filed: Dec. 3, 1975

[51] Int. Cl.$^2$ .............................................. H02P 5/00
[52] U.S. Cl. .................................. 318/314; 318/318; 318/454
[58] Field of Search .......... 318/341, 326, 317, 345 C, 318/346 G, 465, 454, 308, 452, 314, 318; 322/225 C; 307/252 UA

[56] References Cited

U.S. PATENT DOCUMENTS

| 3,119,055 | 1/1964 | Martin | 318/452 |
|---|---|---|---|
| 3,470,428 | 9/1969 | Gill et al. | 318/341 |
| 3,879,652 | 2/1975 | Billings | 307/252 UA |
| 3,925,688 | 12/1975 | Kalfus | 307/252 UA |
| 3,968,414 | 7/1976 | Konrad | 318/341 |

OTHER PUBLICATIONS

Ernst, et al., "Current Zero-Crossing Detection for Thyristor Control", *IBM Tech. Discl. Bull.*, vol. 15, No. 3, p. 734.

*Primary Examiner*—David Smith, Jr.

[57] ABSTRACT

The duty cycle of the alternating current waveform applied to an electric motor is varied by varying the firing point of an SCR circuit. This firing point is varied by logic circuitry which responds to the largest (or smallest) output of several integrators each of which provides an increasing or decreasing control voltage in response to different error signals. The error signals are related to different control criteria such as motor speed, motor current, etc. Thus the error signal indicating the greatest deviation from a set point controls the firing point. Since the output level of the integrators is slow to vary, a high degree of noise immunity is attained.

4 Claims, 2 Drawing Figures

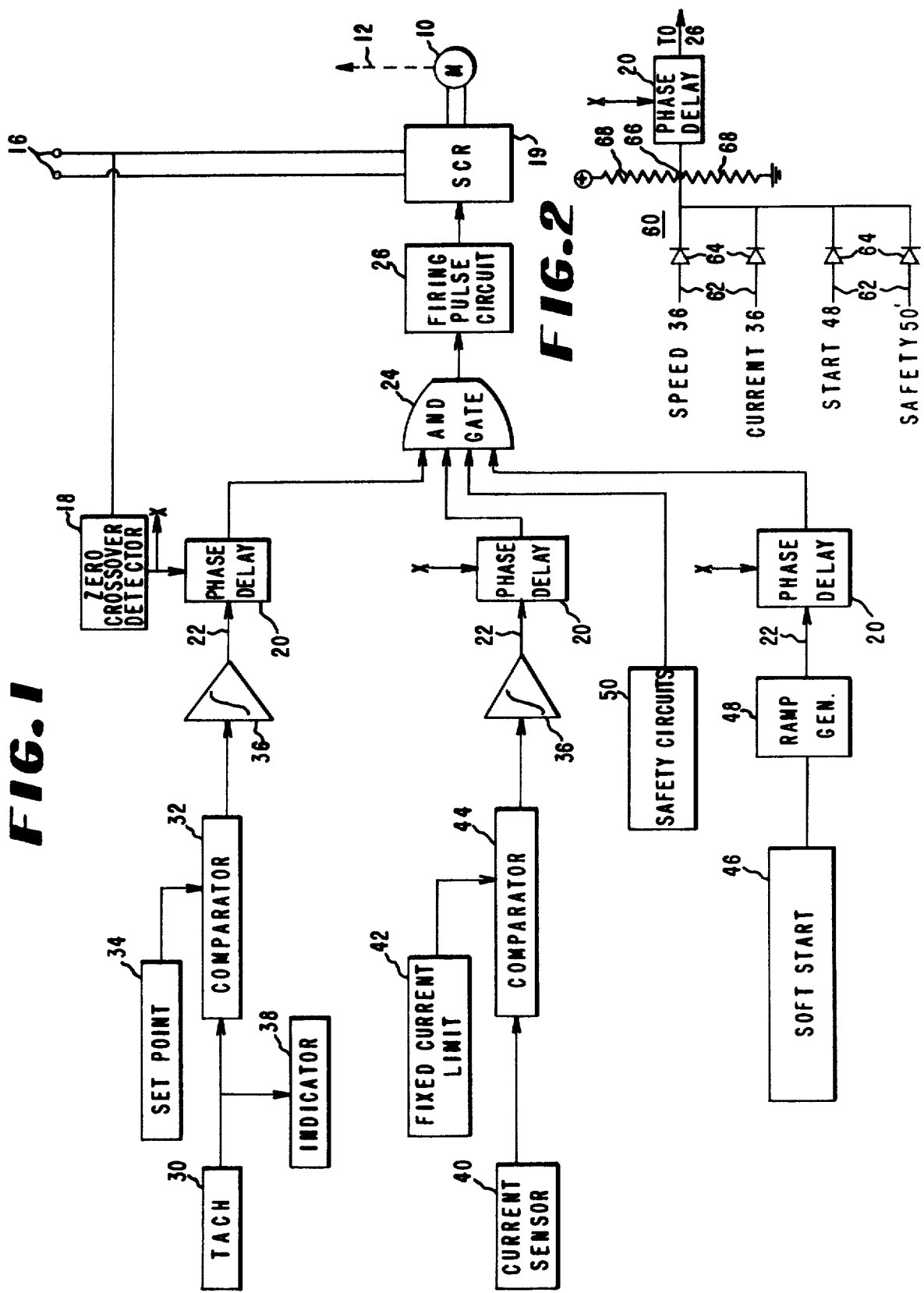

MOTOR CONTROL SYSTEM

BACKGROUND OF THE INVENTION

This invention relates to a motor control system and, more particularly, to a system for controlling the speed of a variable speed motor utilizing multiple control criteria.

There are many motor control circuits available today for controlling the speed of variable speed motors. These systems have used triacs, silicon controlled rectifiers (SRC), and similar switches, whose firing angle is controlled relative to the zero-crossover point of the alternating current waveform, to vary the power supplied to the motor and hence the motor speed.

While such control circuits are rather conventional, there arises a particular problem in some motor drive systems such as those used in centrifuges. Not only must the centrifuges' speed be controlled rather accurately so that the particle sedimentation can be controlled, but also the current supplied to the motor normally must be limited according to several different, often unrelated criteria. Priorities must be assigned so that the criteria having the largest deviation from its set point exercises control over the firing point of the SCR. For example, if the motor current exceeds a certain limit, the duty cycle of the power supplied to the motor should be reduced to prevent overloading the circuits. Often the acceleration and/or deceleration of the centrifuge rotor must be accurately controlled. Finally, in the event of a malfunction, the power supply to the motor must be terminated immediately in a fail-safe fashion.

For the most part, motor control systems of the prior art do not fulfill all of these needs without resort to complex, expensive circuitry. Accordingly, it is an object of this invention to provide an improved system capable of controlling electrical motor speed in accordance with several input criteria.

Another object of this invention is to provide an improved system for controlling a motor speed which system has a degree of noise immunity.

BRIEF DESCRIPTION OF THE INVENTION

In accordance with a preferred embodiment of this invention, a motor control system is provided which varies the speed of a variable speed motor using switching means for selectively varying the duty cycle of an alternating current signal supplied to the motor. The system includes a first signal level generator for generating a first signal level that varies according to a first operating condition, a second signal level generator for generating a second signal level that varies according to a second operating condition, a zero-crossover detector responsive to the alternating current supply for producing pulses corresponding to the zero-crossover times of the alternating current for controlling said switching means, time delay means responsive to the greater deviation of said first and second signal levels from a predetermined value for delaying said zero-crossover pulses, thereby to vary said duty cycle.

Utilizing this particular system, although multiple inputs are used to control motor speed, the duty cycle of the power supplied to the motor is a function of that input condition calling for the shortest duty cycle. In this manner the circuit is fail-safe since if an input signal at so much as one input to the gate is terminated or lost, the motor will be de-energized immediately.

In a particularly preferred embodiment, the first signal level generator includes a first set point signal, a first comparator responsive to the first set point signal and to the first operating condition for varying said first signal level when the first operating condition achieves a predetermined relation to the set point.

The signal level generators may include integrators each responsive to a comparator for integrating, in a first sense, when the predetermined relationship is achieved, and in a second sense opposite said first sense at all other times, thereby to vary the signal levels in a continuous manner. This permits a degree of noise immunity.

BRIEF DESCRIPTION OF THE DRAWINGS

Further advantages and features of this invention will become apparent upon consideration of the following description wherein:

FIG. 1 is a block diagram of a system for controlling motor speed constructed in accordance with a preferred embodiment of this invention; and FIG. 2 is a partial block, partial schematic diagram of an alternative logic circuit for the system of FIG. 1.

DETAILED DESCRIPTION OF THE PREFERRED EMBODIMENT

There is seen in FIG. 1 a motor control system in which the speed of a typical variable speed motor 10 is used to drive, through a suitable linkage, depicted by the dashed line 12, some mechanical device such as the rotor of a centrifuge. The speed of the motor 10 is controlled conventionally by switching devices 14, such as silicon controlled rectifiers (SCR) positioned in at least two legs of a conventional bridge type rectifier configuration. As is known, these switching devices 14 control motor speed by varying the duty cycle of the rectified DC current pulses supplied to the motor. Specifically, the firing point of the SCR devices or switches during each half cycle of the alternating current is derived from the zero-crossover times of an alternating current from a source depicted by the terminals 16.

To control the firing point of the switching devices 14, a zero-crossover detector 18, which may of conventional design and provides a pulse output at each zero-crossing time of the alternating current waveform, is connected to the alternating current terminals 16. The output of the detector 18 is connected to each of a plurality of voltage controlled time or phase delay circuits 20. These time delay circuits 20 each have a voltage level control input 22 which functions to control or vary the timing of an output pulse following each zero-crossover pulse as a function of voltage amplitude. That is, the greater the amplitude of the input signal on the control input 22, the later during each half cycle of the alternating current waveform will be the output pulse.

The output from each of the phase delay circuits 20 is passed to a coincidence or AND gate 24 whose output, which occurs only upon the coincidence of all input signals, (or a one level at all of the inputs) is passed through a firing pulse circuit 26 which provides a suitable pulse for firing the switching devices 14, thereby to control the power supplied to the motor 10. The zero-crossover detector may be a conventional type such as that provided by the integrated circuit chip LN 339. Similarly, the phase or time delay circuits may be conventional in the form of an integrated circuit duplicating the function of a voltage-controlled one shot multivibrator and may for example be an NE 555 chip.

The voltage levels (which control the firing time or angle of the SCR's) control the pulse output time for each of the time delay circuits 20. The several voltage levels are derived from various operating criteria selected to control the speed of the motor 10.

Since the AND gate 24 will not operate to fire the SCR's until all the criteria are satisfied each half cycle, it is apparent that the one voltage level having the greatest amplitude assumes control. Hence that criteria creating the greatest voltage level controls. In the case illustrated in the sole figure, four different operating criteria are used, the first being motor speed. For this purpose, the first input (the upper line in the drawing), is derived from a tachometer 30, which in analog form provides an analog signal to a voltage comparator 32. In the comparator the output voltage from the tachometer, which is proportional to speed of the motor 10 (and/or the rotor 12), is compared to a set point level determined by a set point reference voltage 34. The function of the comparator in this instance is such that a low voltage level or binary zero is established at the output of the comparator until such time as the speed, as represented by the tachometer voltage, equals or exceeds that represented by the set point. In turn, the output of the comparator is connected to a signal level generator or integrator 36 whose output provides the input 22 to one of the time delay circuits 20. The low level or binary zero output signal from the comparator causes the integrator 36 to integrate in a first sense, i.e., downwardly. Conversely once the set point is reached or exceeded, depending upon design, the output of the comparator provides a high level output signal, corresponding to a binary 1, which causes the integrator 36 to integrate in the opposite sense, i.e., upwardly. Thus the integrator is constantly integrating either upwardly or downwardly at a constant rate to provide a voltage control signal to the time delay circuit 20 which seeks to adjust the motor speed in a sense to satisfy the input criteria. This reduces the effects of spurious signals, noise, and the like and has the particular advantage of providing a more stable operation.

Alternatively, of course, the tachometer may be a digital tachometer in which event the comparator will be a digital comparator as will the input from the set point unit 34. Typical analog circuits that may be used for the comparator 32 will be that of an integrated circuit chips SN 72710, whereas the integrator 36 may be an integrated circuit chip SN 72741.

To complete a description of the speed control operation, the integrator integrates upwardly, in the event the set point speed has been reached, and motor speed is to be maintained or reduced at that level, to increase the delay in the firing point each cycle and thereby decrease the duty cycle or power applied in the motor, thereby reducing motor speed. The converse is also true. The integrator thus is seen to continuously integrate either upwardly or downwardly to either increase or decrease the time delay depending upon the particular operating conditions needed to adjust motor speed to that called for by the set point. The control is seen to be a closed loop system.

The second channel, by way of example, may be used to limit the current supplied to the motor 10. Such an overload protection device is particularly desirable with laboratory centrifuges since the power available in the laboratory often is limited. This current limit control thus prevents overload of the circuits in a typical user's laboratory. A current sensor 40 of conventional type is connected to sense the current drawn by the motor 10. Its output, which may be in the form of an analog signal, is coupled, as is the output of a reference or set point current level, to a comparator 44. When the set point current level is reached, the output of the comparator 44 goes high (binary 1) thereby causing the integrator 36 in the current sensor channel to integrate upwardly thereby retarding the firing angle and reducing the average current supplied to the motor. Conversely, so long as the current is below the said set point level, the integrator is integrating downwardly ultimately permitting, if the criteria on the other channels is satisfied, the firing of the SCRs to occur immediately after zero-crossover points which is the maximum current condition.

A third input to the gate means 24 may be provided by a third channel which may be a "start" channel. This channel may include a switch, depicted by the box 46, used to initiate a decreasing ramp waveform derived from the ramp generator 48 which is applied to the control input 22 of the voltage controlled delay 20. The ramp generator may be a conventional integrated circuit such as that available on the chip SN 72741. Thus with decreasing amplitude waveform provided by the ramp generator, the voltage applied to the time delay circuit 22 is gradually decreased, thereby gradually advancing the firing angle of the SCR during each half cycle of the alternating waveform supplying more power to the motor. This results in a gradual increase of motor speed. This is often termed a "soft" start and is useful in that it does not disturb gradients used in centrifuge separations to the extent a rapid or "hard" start does.

A final input to the gate 24 may be provided from a simple switch 50 which may be a timer or any other safety circuit which normally maintains a high voltage level (binary 1) in the absence of having sensed an alarm condition or the end of a timed run. For example, when the time is up or an alarm condition sensed, the binary 1 level voltage is removed from the coincidence or "AND" gate means 24. The function of the AND gate 24 is such that in the absence of any one input the SCRs 14 are not permitted to fire. Hence, that input condition or criteria demanding the latest firing angle for the SCRs and thus the lowest duty cycle will be the controlling condition or criteria. This controlling condition may be motor current, motor speed, a motor startup program, or some safety or time condition. In the event of some sensed malfunction, the fail-safe circuit 50 will withdraw an input, thereby totally retarding the firing angle and removing all power from the motor. The system is at least partly fail-safe since the absence of any condition will "turn-off" the motor.

The utilization of the integrators 36 which are continually integrating in one direction or the other, i.e., up or down voltage-wise, provides a relatively stable circuit which is capable of independent operation even though a particular signal during a cycle may be missed.

Another embodiment of the invention is depicted in FIG. 2 in which the circuit elements shown may be substituted for the several phase delays 20 and AND gate 24. This substitution involves an analog gate 60 having its plural inputs 62 coupled to the respective speed control integrator 36, current limiter integrator 36, start ramp generator 48, and a modified safety circuit 50'. In this instance, the safety circuits may provide a voltage level in the event of malfunction to reduce the duty cycle and shut down the motor. Each input 62 is coupled with forward direction through a unidirectional conducting device or diode 64 to the midpoint 66 of a voltage divider 68 connected between a source of potential and ground. The midpoint 66 is also connected directly to a single voltage controlled time or phase delay circuit 20' which delays the firing pulses applied to the firing pulse circuit 26. In operation, the analog gate 60 selects and passes to the phase delay circuit that voltage level having the highest value above the reference level established to midpoint 66 by the divider 68. This voltage level and this voltage level alone acts as previously described to retard the firing point of the switches 14 and hence lowers the duty cycle and power supplied to the motor. The reference level is selected to be that level which provides a full duty cycle with no delay of the firing angle. Thus any input voltage from an integrator or other source less than the reference level is unable to forward bias its diode 64 and is isolated from the circuit.

The systems described are seen to provide stable, multi-criteria control of motor speed. Any one criteria may be given particular precedence over another simply by modifying the integration time constant. Thus the response to current may be made fast while response to speed changes slow.

We claim:

1. In a motor control system for controlling speed of a variable speed motor, using switching means for selectively varying the duty cycle of an alternating current signal supplied to said motor, in accordance with different operating conditions, the combination comprising:
   a first signal level generator for generating a first signal level that varies in the presence of a first operating condition, said first signal level generator including: an integrator responsive to the presence of said first operating condition for integrating in a first sense and in a second sense opposite said first sense at all other times, thereby to vary said first signal level,
   a second signal level generator for generating a second signal level that varies according to a second operating condition,
   a zero-crossover detector responsive to said alternating current signal for producing zero-crossover pulses corresponding to the zero-crossover times of said signal for controlling said switching means, and
   time delay means responsive to the greater deviation of said first and second signal levels from a predetermined level for delaying said zero-crossover pulses for a time period proportional to the amplitude of said greater deviation, thereby to vary said duty cycle of said alternating current signal in accordance with said first or second levels having the greater deviation from said predetermined level.

2. A motor control system according to claim 1 wherein said integration occurs in both senses at constant rates.

3. A motor control system according to claim 1 wherein said first operating condition is motor speed, and said combination includes a tachometer coupled to said motor for providing a motor speed related signal for comparison with said first set point signal in said comparator.

4. A motor control system according to claim 1 wherein said first operating condition is motor current, and said combination includes a current sensor for sensing said motor current for comparison with said first set point signal.

* * * * *